United States Patent
Shaffer et al.

(10) Patent No.: US 9,479,963 B2
(45) Date of Patent: Oct. 25, 2016

(54) COLLISION AVOIDANCE FOR WIRELESS NETWORKS

(71) Applicant: Cisco Technology, Inc., San Jose, CA (US)

(72) Inventors: Shmuel Shaffer, Palo Alto, CA (US); Sandeep J. Shetty, San Jose, CA (US); Jean-Philippe Vasseur, Saint Martin d'Uriage (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/484,755

(22) Filed: Sep. 12, 2014

(65) Prior Publication Data

US 2015/0003251 A1    Jan. 1, 2015

Related U.S. Application Data

(63) Continuation of application No. 12/971,540, filed on Dec. 17, 2010, now Pat. No. 8,873,526.

(51) Int. Cl.

| | |
|---|---|
| *H04W 28/04* | (2009.01) |
| *H04W 74/08* | (2009.01) |
| *H04L 12/741* | (2013.01) |
| *H04L 12/841* | (2013.01) |
| *H04W 84/18* | (2009.01) |

(52) U.S. Cl.
CPC ............ *H04W 28/044* (2013.01); *H04L 45/74* (2013.01); *H04L 47/286* (2013.01); *H04W 74/085* (2013.01); *H04W 28/04* (2013.01); *H04W 84/18* (2013.01)

(58) Field of Classification Search
CPC ........... H04W 28/044; H04W 74/085; H04W 84/18; H04L 47/286
See application file for complete search history.

(56) References Cited

U.S. PATENT DOCUMENTS

| | | |
|---|---|---|
| 5,974,051 A | 10/1999 | De Nicolo et al. |
| 6,181,708 B1 | 1/2001 | Quackenbush et al. |
| 6,831,925 B1 * | 12/2004 | Subrahmanyan et al. ..... 370/447 |
| 6,879,645 B1 | 4/2005 | Webber, Jr. et al. |

(Continued)

OTHER PUBLICATIONS

Gummalla & Limb "Wireless Medium Access Control Protocols" IEEE Surveys and Tutorials, Q2 2000.*

(Continued)

*Primary Examiner* — Xavier Szewai Wong
(74) *Attorney, Agent, or Firm* — Parker Ibrahim & Berg LLC; James M. Behmke; Stephen D. LeBarron

(57) ABSTRACT

In one embodiment, a particular node in a wireless network may receive a wireless signal, and may determine whether the wireless signal is intended for itself. In response to determining that the wireless signal is intended for the particular node, the particular node may transmit a non-colliding wireless carrier sense detected alert (CSDA) signal during the received wireless signal to request that other nodes within communication distance of the particular node refrain from transmitting for a duration of the received wireless signal. In another embodiment, a node listens on a first frequency for a wireless CSDA signal regarding a second (colliding) frequency, and in response to receiving a CSDA signal, may refrain from transmitting a wireless signal on the second frequency for the particular duration, or else (if not receiving a CSDA signal), may allow transmission of a wireless signal on the second frequency, accordingly.

13 Claims, 15 Drawing Sheets

(56) References Cited

U.S. PATENT DOCUMENTS

| | | |
|---|---|---|
| 6,941,364 B2 | 9/2005 | Kim et al. |
| 7,061,877 B1 * | 6/2006 | Gummalla et al. ............ 370/278 |
| 7,197,013 B2 | 3/2007 | Douglas et al. |
| 7,385,945 B1 | 6/2008 | Olson et al. |
| 7,417,949 B2 | 8/2008 | Weller et al. |
| 7,535,822 B2 * | 5/2009 | Geile ................ G06F 17/14 370/203 |
| 7,551,578 B2 | 6/2009 | Pollack et al. |
| 7,596,461 B2 | 9/2009 | Hart et al. |
| 7,620,000 B2 | 11/2009 | Meier |
| 7,756,542 B1 | 7/2010 | Kaiser et al. |
| 7,801,096 B2 | 9/2010 | Myles et al. |
| 7,813,384 B2 | 10/2010 | Wellum et al. |
| 7,830,795 B2 | 11/2010 | Zimmerman et al. |
| 7,924,867 B2 * | 4/2011 | Haas et al. ................. 370/445 |
| 7,965,733 B2 * | 6/2011 | Chan et al. ................. 370/445 |
| 8,594,120 B2 * | 11/2013 | Mangold et al. ............. 370/445 |
| 8,614,961 B1 * | 12/2013 | Katar ................. H04L 12/2838 370/252 |
| 8,873,526 B2 * | 10/2014 | Shaffer ............... H04W 74/085 370/329 |
| 2002/0126690 A1 * | 9/2002 | Narayana et al. ............ 370/444 |
| 2003/0012176 A1 | 1/2003 | Kondylis et al. |
| 2003/0200306 A1 | 10/2003 | Park et al. |
| 2004/0081127 A1 * | 4/2004 | Gardner ............ H04N 1/00204 370/338 |
| 2006/0135145 A1 | 6/2006 | Redi |
| 2006/0229083 A1 | 10/2006 | Redi |
| 2009/0067448 A1 * | 3/2009 | Stanwood et al. ........... 370/447 |
| 2009/0135773 A1 | 5/2009 | Aghili et al. |
| 2009/0252144 A1 | 10/2009 | Ji |
| 2011/0013575 A1 | 1/2011 | Liao et al. |
| 2011/0051674 A1 * | 3/2011 | Niedzwiecki et al. ....... 370/329 |
| 2011/0205961 A1 * | 8/2011 | Santivanez et al. .......... 370/328 |
| 2012/0182952 A1 | 7/2012 | Stanwood et al. |

OTHER PUBLICATIONS

Gummalla & Limb "Wireless Collision Detect (WCD): Multiple Access with Receiver Initiated Feedback and Carrier Detect Signal" IEEE ICC 2000, vol. 2, pp. 397-401.*

* cited by examiner

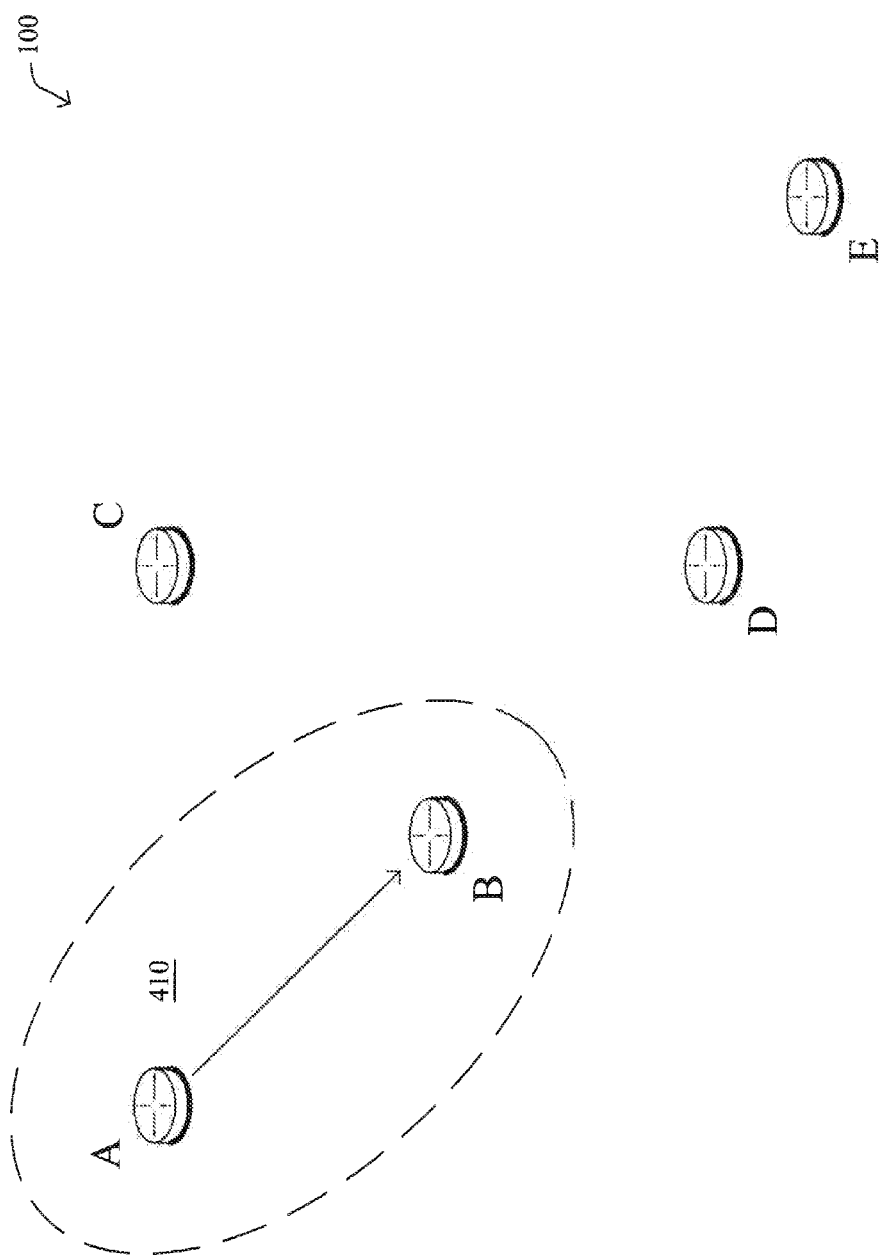

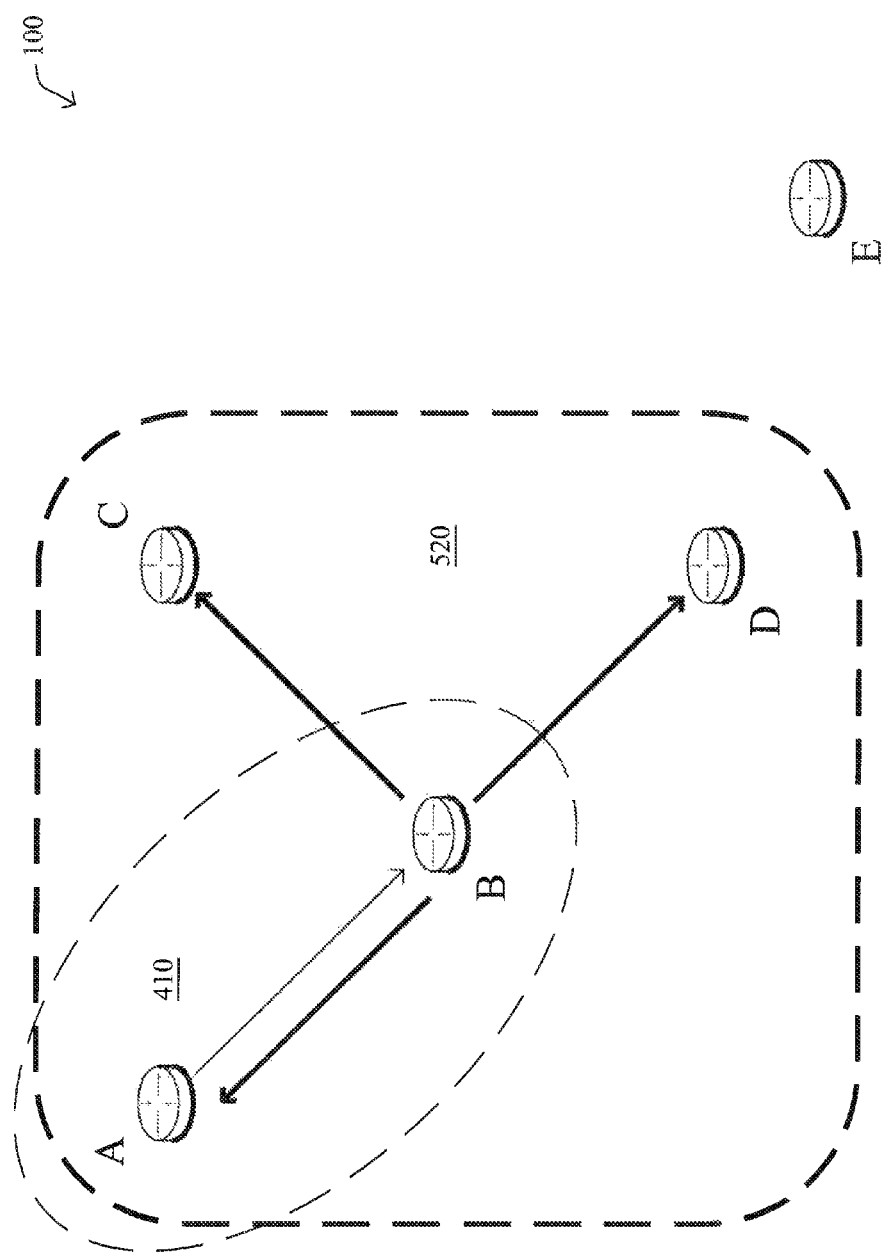

COLLISION AVOIDANCE FOR WIRELESS NETWORKS

TECHNICAL FIELD

The present disclosure relates generally to wireless communication, and, more particularly, to collision avoidance in wireless networks.

BACKGROUND

Wireless systems conventionally do not employ the known Carrier Sense Media Access Control/Collision Avoidance (CSMA/CA) protocol because it cannot prevent collision of packets from "hidden nodes". For example, assume that a first node "A" and a second node "C" are each within wireless range of a third node "B", but nodes A and C are out of wireless range from each other. Since nodes A and C cannot hear each other, in the event both nodes attempt to send a wireless signal/packet to node B at the same time, the signals would collide and corrupt each other, rendering the received signal at node B incomprehensible. Because nodes A and C cannot hear each other, adding the current CSMA/CA protocol to the nodes would not have resolved the collision issue, as nodes A and C each had no indication of transmission by the other node. In other words, even if all nodes are equipped with carrier sensing capabilities, which would allow them to sense if another node is transmitting, this carrier sensing cannot help avert collisions of packets from hidden nodes such as A and C (hidden to each other).

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 5A-B illustrate an example sequence of wireless transmissions to avoid collisions;

DESCRIPTION OF EXAMPLE EMBODIMENTS

Overview

Figure 1:
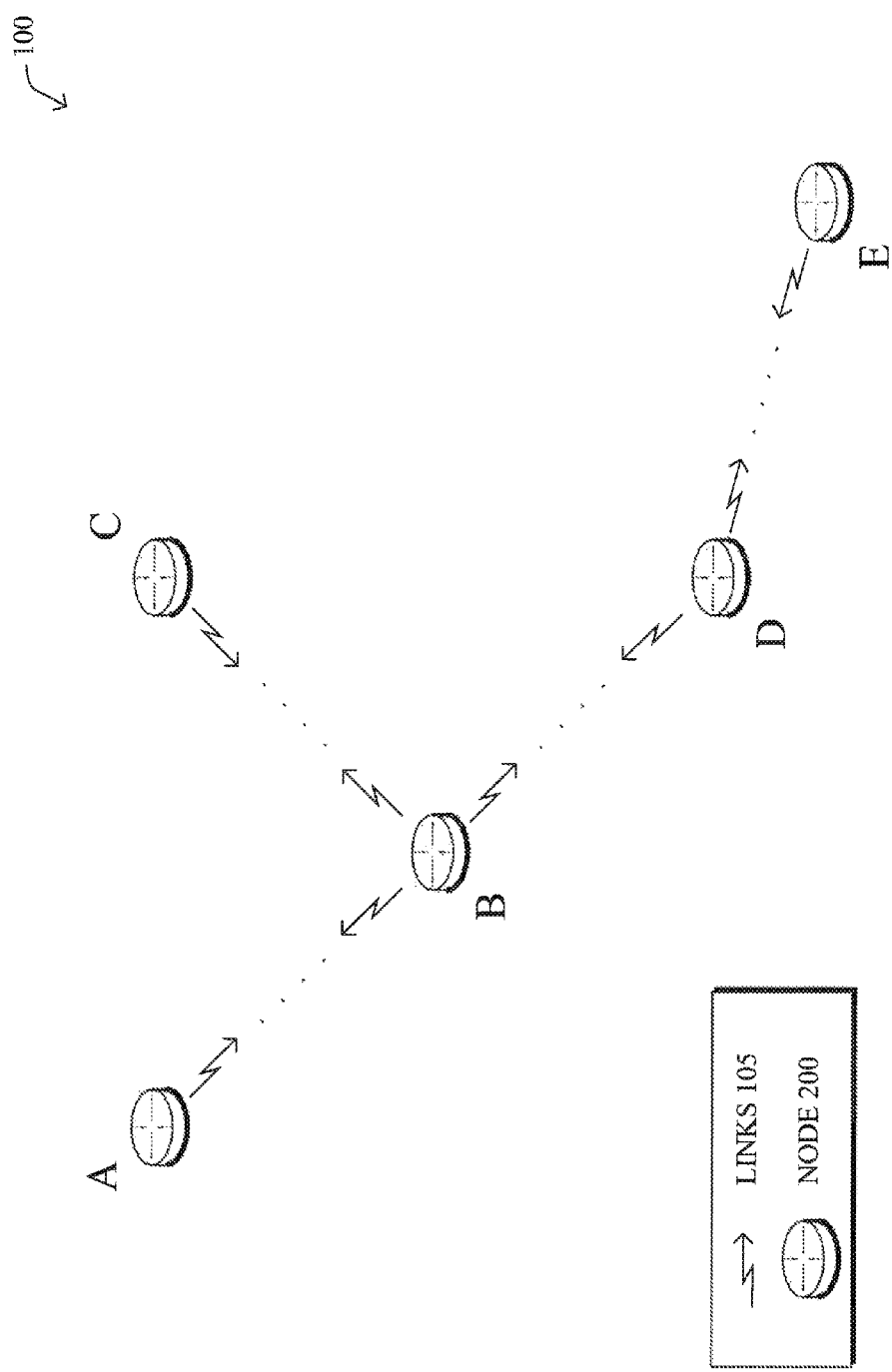
FIG. 1 illustrates an example wireless network.

According to one or more embodiments of the disclosure, a particular node in a wireless network may receive a wireless signal, and may determine whether the wireless signal is intended for itself. In response to determining that the wireless signal is intended for the particular node, the particular node may transmit a non-colliding wireless carrier sense detected alert (CSDA) signal during the received wireless signal to request that other nodes within communication distance of the particular node refrain from transmitting for a duration of the received wireless signal.

According to one or more additional embodiments of the disclosure, a node listens on a first frequency for a wireless CSDA signal regarding a second (colliding) frequency, and in response to receiving a CSDA signal, may refrain from transmitting a wireless signal on the second frequency for the particular duration, or else (if not receiving a CSDA signal), may allow transmission of a wireless signal, accordingly.

Description

A network is a geographically distributed collection of nodes interconnected by communication links and segments for transporting data between end nodes, such as personal computers and workstations, or other devices, such as radios, sensors, etc. Many types of computer networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, CPL G3, Watt Pulse Communication (WPC) and others.

A wireless network, in particular, is a type of network where a plurality of nodes communicate over a wireless medium, such as using radio frequency (RF) transmission through the air. For example, a Mobile Ad-Hoc Network (MANET) is a kind of wireless ad-hoc network, which is generally considered a self-configuring network of mobile routes (and associated hosts) connected by wireless links, the union of which forms an arbitrary topology. For instance, Low power and Lossy Networks (LLNs), e.g., certain sensor networks, may be used in a myriad of applications such as for "Smart Grid" and "Smart Cities," and may often consist of wireless nodes in communication within a field area network (FAN). LLNs are generally considered a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

FIG. 1 is a schematic block diagram of an example wireless network 100 (e.g., computer network, communication network, etc.) illustratively comprising nodes/devices 200 (e.g., labeled as shown, "A," "B," "C," "D," and "E") interconnected by wireless communication (links 105). In particular, certain nodes 200, such as, e.g., routers, sensors, computers, radios, etc., may be in communication with other nodes 200, e.g., based on distance, signal strength, current operational status, location, etc. Those skilled in the art will understand that any number of nodes, devices, links, etc. may be used in the wireless network, and that the view shown herein is for simplicity (particularly, that while routers are shown, any wireless communication devices A-E may be utilized). Also, while the embodiments are shown herein with reference to a generally wireless network, the description herein is not so limited, and may be applied to networks that have wired and wireless links.

Data packets (e.g., traffic and/or messages sent between the devices/nodes) may be exchanged among the nodes/devices of the computer network 100 using predefined network communication protocols such as certain known wireless protocols (e.g., IEEE Std. 802.15.4, WiFi, Bluetooth®, etc.) In this context, a protocol consists of a set of rules defining how the nodes interact with each other.

Figure 2:
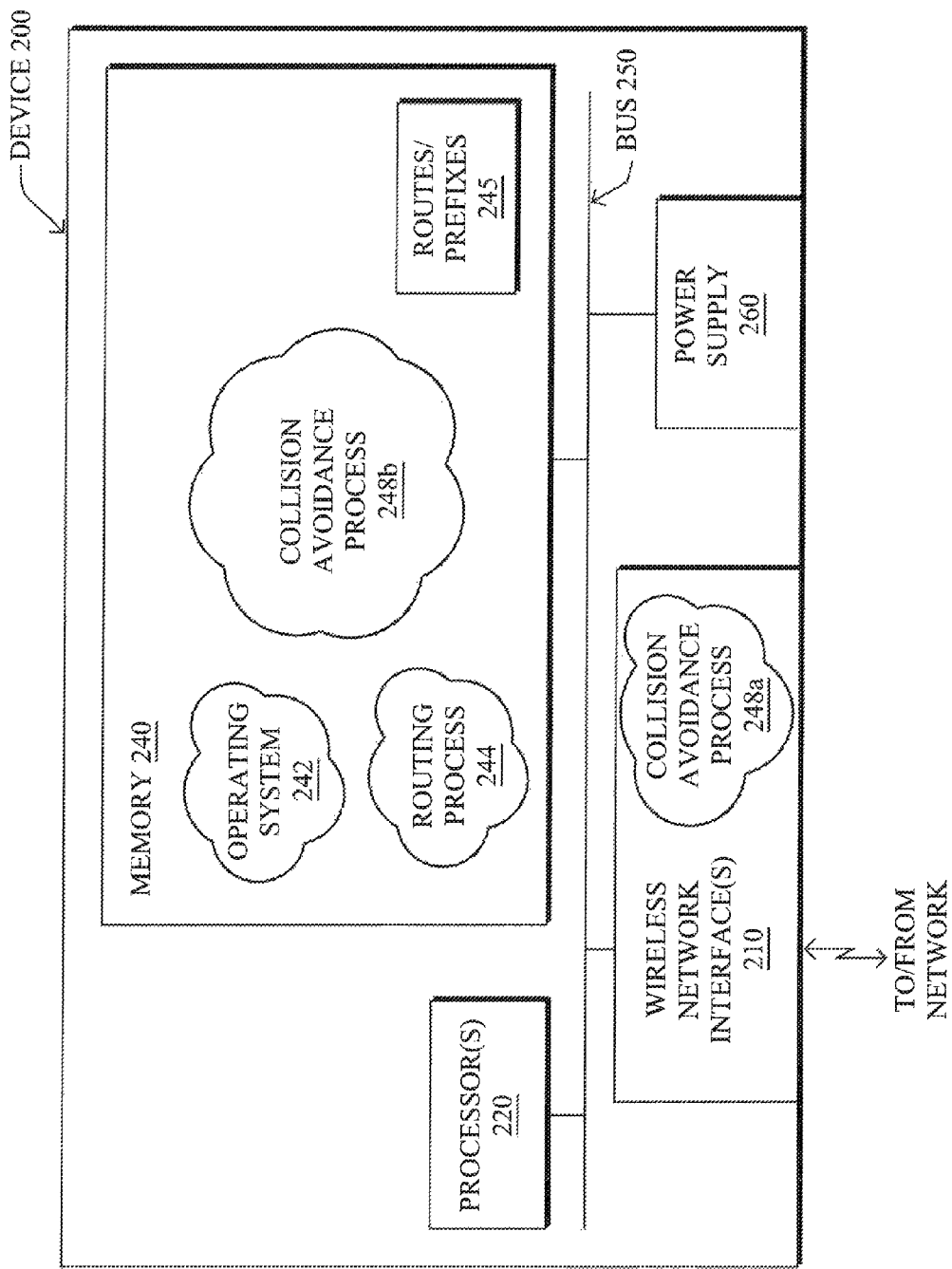
FIG. 2 illustrates an example wireless device/node.

FIG. 2 is a schematic block diagram of an example node/device 200 that may be used with one or more embodiments described herein, e.g., as nodes A-E. The device may comprise one or more wireless network interfaces 210, at least one processor 220, and a memory 240 interconnected by a system bus 250, as well as a power supply 260 (e.g., battery, plug-in, etc.).

The wireless network interface(s) 210 contain the mechanical, electrical, and signaling circuitry for communicating data over wireless links coupled to the network 100. The network interfaces may be configured to transmit and/or receive data using a variety of different wireless communication protocols as noted above and as will be understood by those skilled in the art. In addition, the interfaces 210 may comprise an illustrative collision avoidance process 248*a*, which may be contained within a suitable wireless communication protocol process (e.g., as an extension to current protocols), and may be executed by an independent processor of the interface 210, not explicitly shown. Note, further, that the nodes may have two different types of network connections 210, namely, wireless and wired/physical connections.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device). The processor 220 may comprise necessary elements or logic adapted to execute the software programs and manipulate the data structures, such as routes or prefixes 245 (notably on capable devices only). An operating system 242, portions of which are typically resident in memory 240 and executed by the processor, functionally organizes the device by, inter alia, invoking operations in support of software processes and/or services executing on the device. These software processes and/or services may comprise routing process/services 244, and optionally a collision avoidance process 248*b*, for use as described herein.

It will be apparent to those skilled in the art that other processor and memory types, including various non-transitory computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process).

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table 245 containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Figure 3:
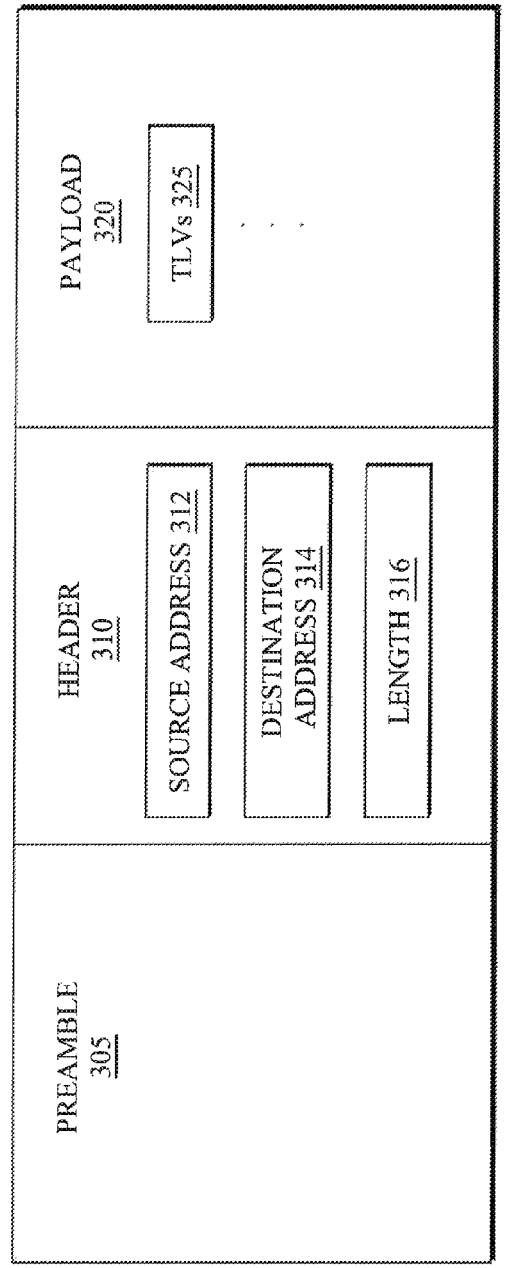
FIG. 3 illustrates an example message.

FIG. 3 illustrates an example simplified message/packet format 300 that may be used to communicate information between devices 200 in the network. For example, message 300 illustratively comprises a header 310 with one or more fields such as a source address 312, a destination address 314, and a length field 316, as well as other fields, such as Cyclic Redundancy Check (CRC) error-detecting code to ensure that the header information has been received uncorrupted, as will be appreciated by those skilled in the art. Within the body/payload 320 of the message may be any information to be transmitted, such as user data, control-plane data, etc. In certain embodiments herein, the message payload 320 may comprise specific information that may be carried within one or more type-length-value (TLV) fields 325 as described herein. In addition, based on certain wireless communication protocols, a preamble 305 may precede the message 300 in order to allow receiving devices to acquire the transmitted message, and synchronize to it, accordingly.

As noted above, wireless systems conventionally do not employ the known Carrier Sense Media Access Control/Collision Avoidance (CSMA/CA) protocol because it cannot prevent collision of packets from "hidden nodes". In particular, CSMA is a probabilistic Media Access Control (MAC) protocol in which a node verifies the absence of other traffic before transmitting on a shared transmission medium (e.g., a particular RF band) based on detecting a carrier wave from another node on the medium. In particular, CSMA/CA is a known wireless network multiple access method which uses carrier sensing, where a node wishing to transmit data has to first listen to the channel for a predetermined amount of time to determine whether or not another node is transmitting on the channel within the wireless range. If the channel is sensed "idle," then the node is permitted to begin the transmission process. If the channel is sensed as "busy," then the node defers its transmission for a period of time (e.g., random).

Figure 4:
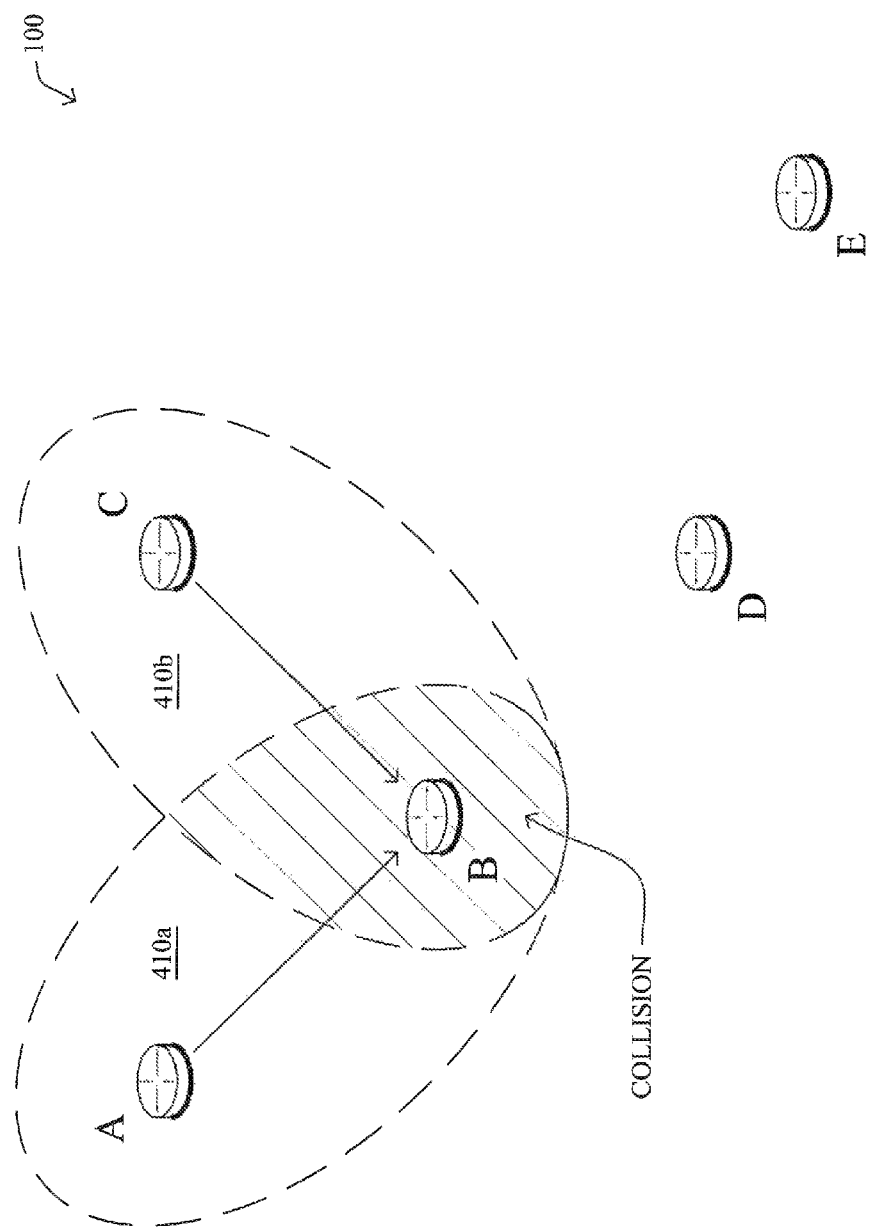
FIG. 4 illustrates an example wireless collision.

One issue with CSMA/CA may be illustrated with reference to FIG. 4. In particular, assume that a first node "A" and a second node "C" of the network 100 (of FIG. 1) are each within wireless range of a third node "B", but nodes A and C are out of wireless range from each other. Since nodes A and C cannot hear each other, in the event both nodes attempt to send a wireless signal/packet 410 (a and b) to node B at the same time, the radio signals would collide and corrupt each other, rendering the received signal at node B incomprehensible. Because nodes A and C cannot hear each other, the CSMA/CA protocol would not have resolved the collision issue, as nodes A and C each had no indication of transmission by the other node (i.e., nodes A and C are hidden to each other).

Optionally, a permission-based communication protocol may be used to better handle situations such as the hidden node problem mentioned above. For example, a "Request to Send/Clear to Send" (RTS/CTS) exchange, such as the IEEE Std. 802.11 RTS/CTS exchange, can be utilized to reduce frame collisions introduced by hidden nodes. According to a conventional RTS/CTS exchange, a node wishing to send data initiates the process by sending an RTS frame, and the destination node replies with a CTS frame. Any other node receiving the RTS or CTS frame should refrain from sending data for a given time, thus alleviating the hidden node problem (note that the amount of time the node should wait before trying to get access to the medium is included in both the RTS and the CTS frame). Accordingly, RTS/CTS is one manner to implement a "virtual" carrier sensing mechanism for CSMA/CA.

Typically, sending RTS/CTS frames does not occur unless the packet size exceeds some threshold (e.g., over 2347 octets in length). That is, if the packet size the node wants to transmit is larger than the threshold, the RTS/CTS handshake is triggered, otherwise, the data frame may be sent immediately. As such, RTS/CTS is not always suitable for all types of networks, particular those with smaller packet sizes. For instance, the RTS/CTS exchange adds overhead to the data transmission in the network, e.g., the RTS and CTS frames themselves, as well as the delay in transmitting the data until the RTS/CTS exchange is completed. Also, the RTS/CTS model assumes that nodes request permission to send their packet, which may not be the case in all network configurations. For example, a node (e.g., A) may simply begin transmitting a packet to another node (e.g., B) without permission (that is, without explicit permission (e.g., CTS) to transmit that particular packet: node A and B generally have permission to communicate with each other). Moreover, for various reasons, a CTS may not be received by all pertinent nodes, such as due to intermittent node communication, LLN behavior generally, other collisions during the CTS (e.g., from other directions), etc. As such, these nodes may send RTS frames (e.g., continuously) to a node that is already receiving a transmission, and this RTS frame would collide with the current transmission, rendering it incomprehensible, adversely disrupting the current transmission.

Providing Collision Avoidance in Wireless Networks

Techniques described herein enhance radio channel utilization by reducing packet collisions, including collision of packets from hidden nodes. Specifically, according to one or more embodiments of the disclosure, a particular node in a wireless network may receive a wireless signal, and may determine whether the wireless signal is intended for itself. In response to determining that the wireless signal is intended for the particular node, the particular node may transmit a non-colliding wireless carrier sense detected alert (CSDA) signal during the received wireless signal to request that other nodes within communication distance of the particular node refrain from transmitting for a duration of the received wireless signal. According to one or more additional embodiments of the disclosure, a node listens on a first frequency for a wireless CSDA signal regarding a second (colliding) frequency, and in response to receiving a CSDA signal, may refrain from transmitting a wireless signal on the second frequency for the particular duration, or else (if not receiving a CSDA signal), may allow transmission of a wireless signal on the second frequency, accordingly.

Illustratively, the techniques described herein may be performed by hardware, software, and/or firmware, such as in accordance with collision avoidance process 248 (a or b), which may contain computer executable instructions executed by the processor 220 to perform functions relating to the novel techniques described herein, such as within a wireless interface (e.g., as part of a wireless communication protocol). For example, the techniques herein may be treated as extensions to conventional wireless communication protocols, such as the 802.11 protocol, WiFi, etc., and as such, would be processed by similar components understood in the art that execute such protocols, accordingly.

Operationally, assume that, as shown in FIG. 5A, node A sends a wireless signal 410 (e.g., a packet) to node B. Node B may receive the wireless signal, thus sensing the incoming packet. As such, node B may determine whether the wireless signal is intended for itself or another node, illustratively by examining (decoding) the header 310 to determine whether a destination address 314 within the header corresponds to an address of node B (as generally done for all incoming traffic in existing algorithms). This happens basically as soon as the header is received/decoded, and before the entire packet is received (e.g., the payload 320).

If node B determines that it is the intended target node, that is, the node corresponding to the destination address, it starts sending a Carrier Sense Detected Alert (CSDA) signal to all of its neighbors. In particular, node B, the intended recipient of the wireless signal from A, may transmit a non-colliding wireless CSDA signal during the received wireless signal to request that other nodes within communication distance of node B (node B's neighbors) refrain from transmitting for a duration of the received wireless signal (e.g., determined from the frame length field 316). FIG. 5B illustrates an example transmission of a CSDA signal 520 that radiates from node B to neighbors in B's vicinity (e.g., nodes A, C, and D). Essentially, the CSDA signal notifies the neighbors that node B is receiving information and its immediate neighbors (who can receive and decode the CSDA signal) should not start transmitting new packets. Note that this implies that the nodes within the network, particularly nodes A and B (i.e., certain nodes may have the capability while others may not), have the ability to transmit and receive wirelessly at the same time.

According to an aspect of one or more embodiments herein, the CSDA signal is transmitted on a different, i.e., non-colliding (e.g., orthogonal) frequency from the received wireless transmission (from node A). For instance, the CSDA signal may have one or more of its own dedicated frequencies that all nodes listen for in the network. Alternatively, other algorithms may also be used for determining the non-colliding frequency of the CSDA signals, such as a distinct frequency hopping sequence. Note also that the transmission frequency of the wireless transmission (from A) is known by the nodes in the network, such as based on a certain fixed (assigned) frequency, or based on a determination through a frequency hopping scheme shared within the wireless network, as will be understood by those skilled in the art.

Wireless nodes within the network may thus listen for wireless CSDA signals requesting that the node refrain from transmitting for a particular duration should a CSDA signal be received. In particular, before each node transmits a signal, it may determine whether a CSDA signal has been (or is being) transmitted by one of its neighbors indicating that the present time period is occupied for transmission on a particular frequency. If there has been (or is currently) such a CSDA signal, then the node refrains from transmission. However, in response to not receiving a CSDA signal, the node may allow transmission of a wireless signal, accordingly. Note that in the example of FIG. 5B, and as a general matter, node A also receives the CSDA signal 520 from node B. However, node A knows that the CSDA signal was sent in response to node A's initiated transmission, and as such, node A may continue to send the original information in its signal 410 through to completion.

As a result, the original message from node A to B is sent unaffected (no collision from hidden nodes), as node C would receive node B's CSDA signal, and would refrain from sending its overlapping signal. Notably, node C's wireless transmission need not be intended for node B in order to collide, but since node B would be able to "hear" node C's transmission while node B is receiving a transmission from node A, if node C had transmitted during node A's transmission, node B would be unable to comprehend node A's signal due to the collision. Moreover, the fact that collisions are minimized means that bandwidth waste is minimized and therefore effective useful bandwidth increases. (That is, the network can send packets at a rate greater than the known "ALOHA system" threshold, as may be appreciated by those skilled in the art.)

Figure 6A:
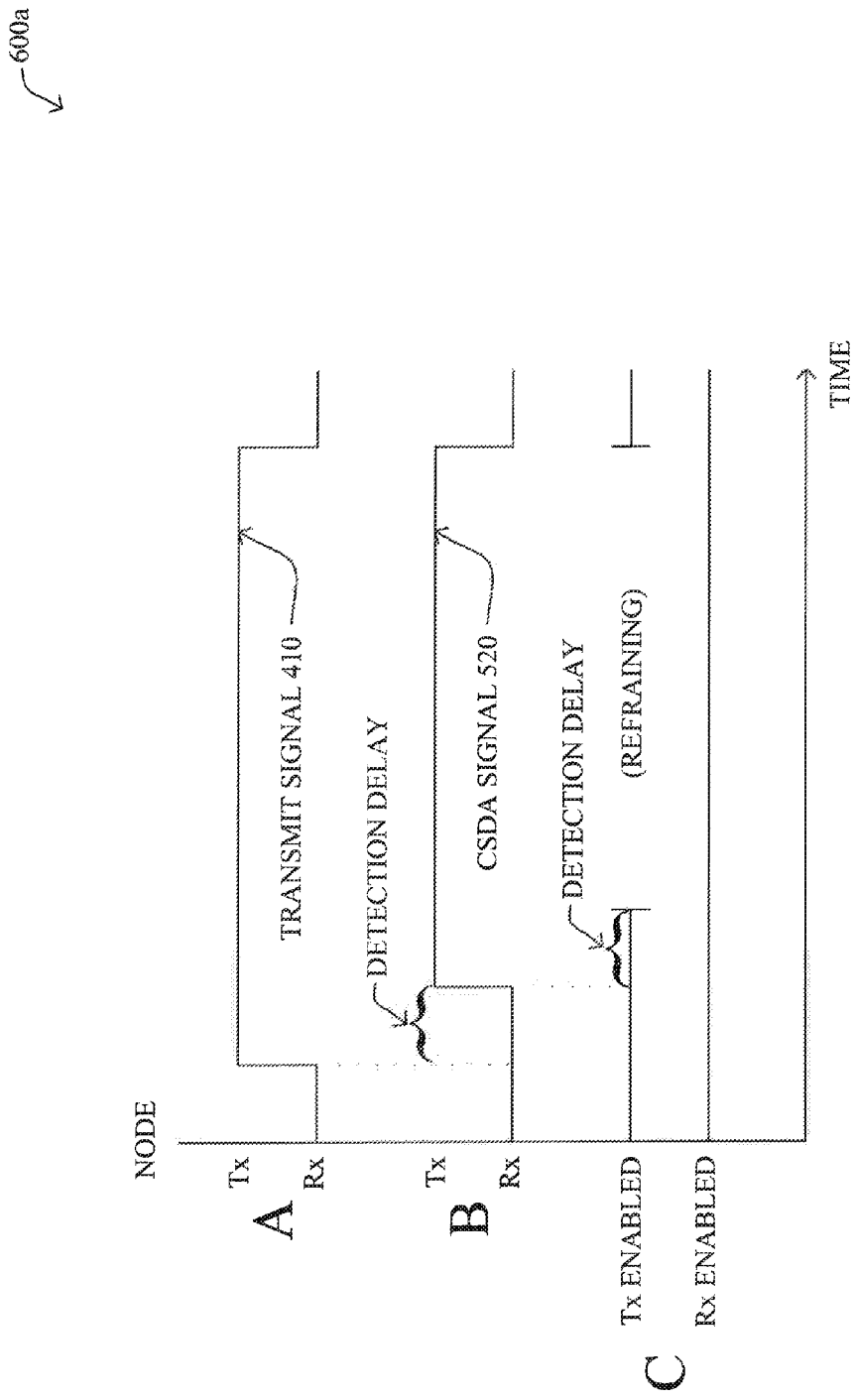
FIGS. 6A-C illustrate example timing diagrams of collision avoidance sequences.
Figure 6B:
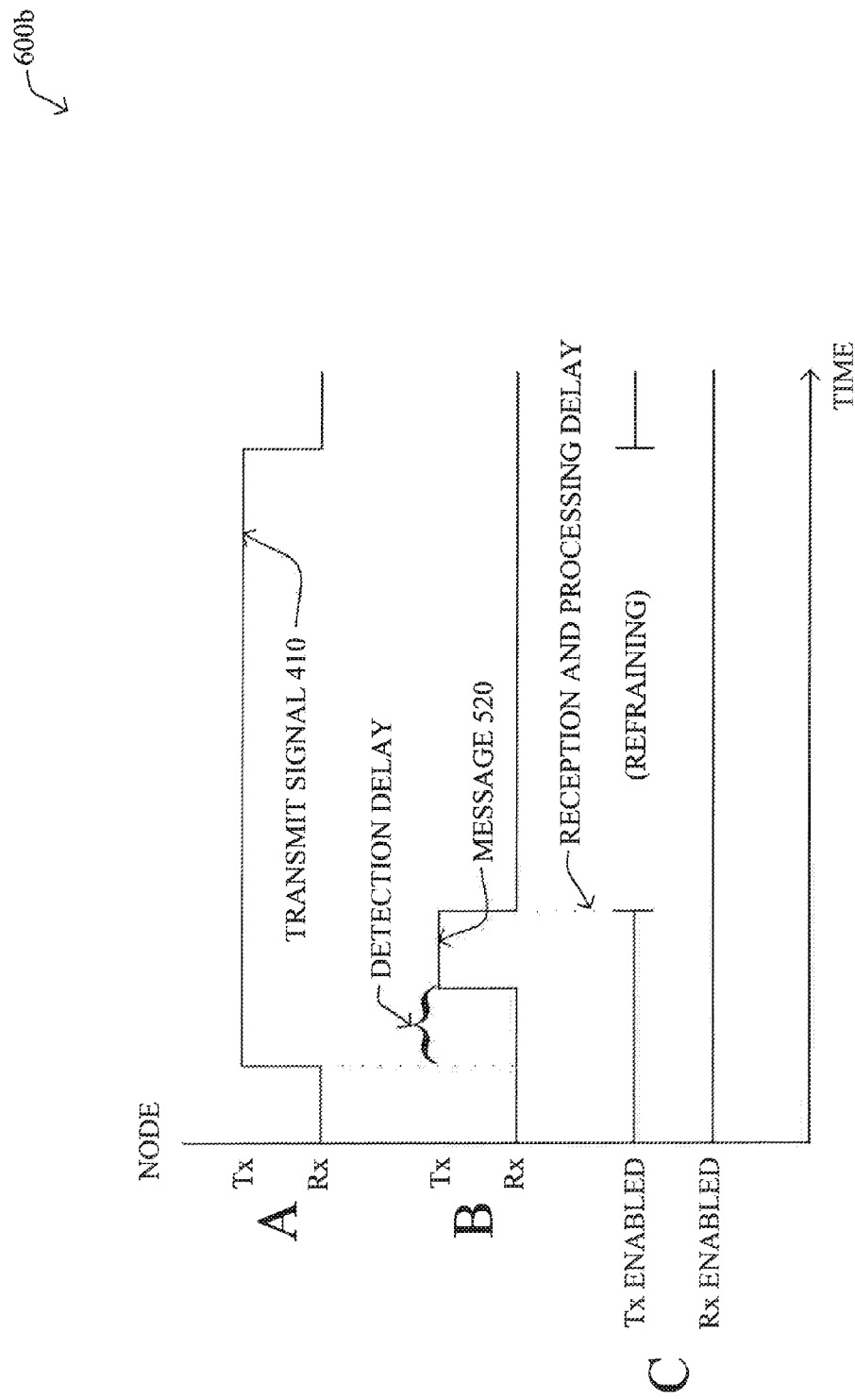
Figure 6C:
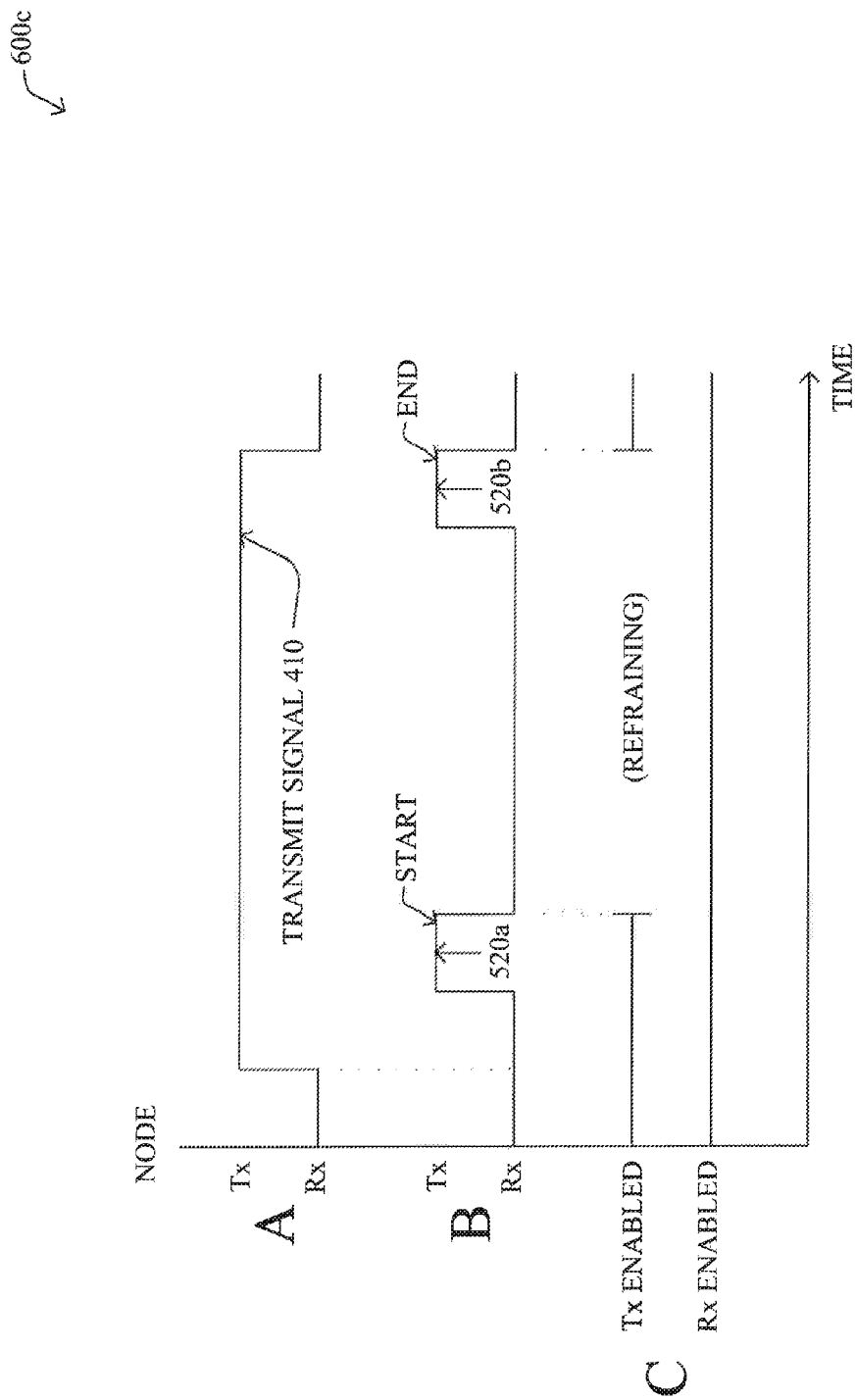

FIGS. 6A-C illustrate different embodiments for CSDA signal transmission in accordance with the techniques herein. First, FIG. 6A illustrates the occasion where the CSDA signals are transmitted as a continuous signal for the duration of the received wireless signal. In particular, when node B detects node A's transmission 410, thus after a certain delay associated with examining the header and verifying that the wireless signal 410 is intended for node B, node B may initiate transmission of a non-colliding CSDA signal 520, such that node C, upon receiving this signal 520, refrains from transmitting any colliding traffic. The CSDA signal in this instance may be a certain pattern, or even white noise transmitted on a particular frequency, so that receiving nodes are able to detect the presence of a signal, and interpret it as a CSDA signal 520, accordingly. If the length of node A's transmission is known by node B, such as from length field 316, then the CSDA signal may be transmitted for precisely the amount of time node A's transmission is slated to last, or else node B may cease transmission of the CSDA signal in response to determining that node A's transmission has completed. At this time, node C may become aware that it is able to transmit traffic, should the need arise.

FIG. 6B illustrates an alternative embodiment, where the CSDA signal 520 may be transmitted as a short broadcast message/packet (e.g., 300) that indicates the duration of the received wireless signal from node A. For instance, where the signal 410 comprises a packet 300 and length field 316, or else where the length of node A's transmission is otherwise known (e.g., distinct time slots for transmission), the CSDA signal 520 as a message may relay this length to its neighbors, informing them about the length of the time it wants to reserve the air time surrounding it to ensure collision-free time. As such, all of the nodes (neighbors of node B who are both neighbors and hidden neighbors of node A) would refrain from transmitting and corrupting the original message from node A to node B during that indicated time period (for a duration of node A's transmission). Note that in one embodiment, included within the message 520 may be a time-to-live (TTL) value of zero (TTL=0, or, alternatively, a "do not repeat" flag) to prevent the other nodes from forwarding the message to their neighbors. In this manner, nodes who receive the CSDA message do not send a further CSDA message into the network, thus preventing initiation of a cascading effect.

FIG. 6C illustrates another alternative embodiment, particularly where transmitting the CSDA signal 520 comprises a first message ("start") that requests that other nodes within communication distance of the particular node refrain from transmitting and a second message ("end") that indicates that other nodes within communication distance of the particular node can resume transmitting. This embodiment may be particularly useful where the length of node A's transmission is unknown, or else where it is more efficient or otherwise practical to explicitly indicate start and end times, rather than indicating a time (such as where simple state machines are used on neighboring nodes as opposed to timers). In the event in this embodiment that the second message 520b (end) is lost or otherwise not decoded properly by the receiving node, a timer in the receiving node may be used to indicate when it may transmit information once again.

Notably, in either FIG. 6B or 6C, node B may periodically retransmit the CSDA signal/message 520 in order to ensure that its neighbors hear the request. For instance, in certain network configurations, wireless nodes may only be activate (i.e., may only be listening) periodically, e.g., to conserve power. In this instance, CSDA signals may be transmitted with a preamble long enough to account for the length of such "non-listening" periods, or else may repeat the message 520 a number of times in an attempt to capture certain ones of the neighbors while they are listening (e.g., "awake"). It should be noted that in case the CSDA message is retransmitted the field in which the packet notifies the receiving node about the remaining time it should refrain from transmitting is modified accordingly.

Figure 7A:
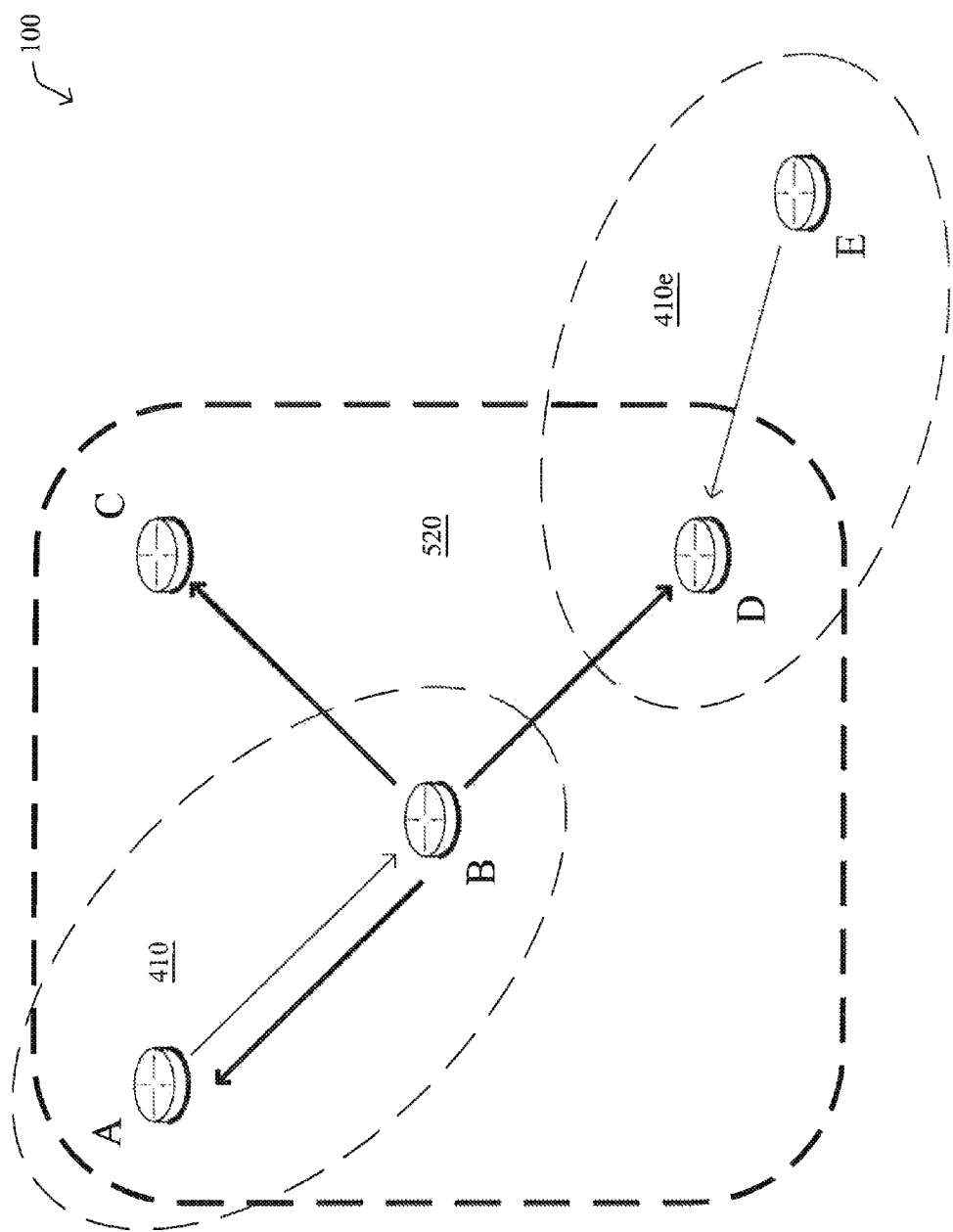
FIGS. 7A-D illustrate examples of non-colliding communication.

Referring now to FIG. 7A, assume that node E wants to send a message 410e to node D during the time that node A sends the original message 410 to node B. Since node E does not receive the CSDA message 520 that B sends, it can send the message to node D without being affected by (and without affecting) the message flow between nodes A and B. Even though in this instance node D is receiving the CSDA message 520 from B, this is an acceptable mode of operation since node D is merely receiving node E's transmission, which is far enough from node B to not collide with node A's transmission (or else node E would allegedly have also received the CSDA signal 520). It should be noted that in this scenario node D may send a CSDA signal on an orthogonal frequency as not to collide with the packet received by node B. Alternatively, in order to prevent corruption of the signal received by node B from node A, node D may refrain from sending a CSDA packet thus exposing itself to the hidden node issue. In such an event, although not all of collisions are prevented, the techniques described herein still alleviate the hidden neighbor issue for many of the nodes in the system.

Figure 7B:
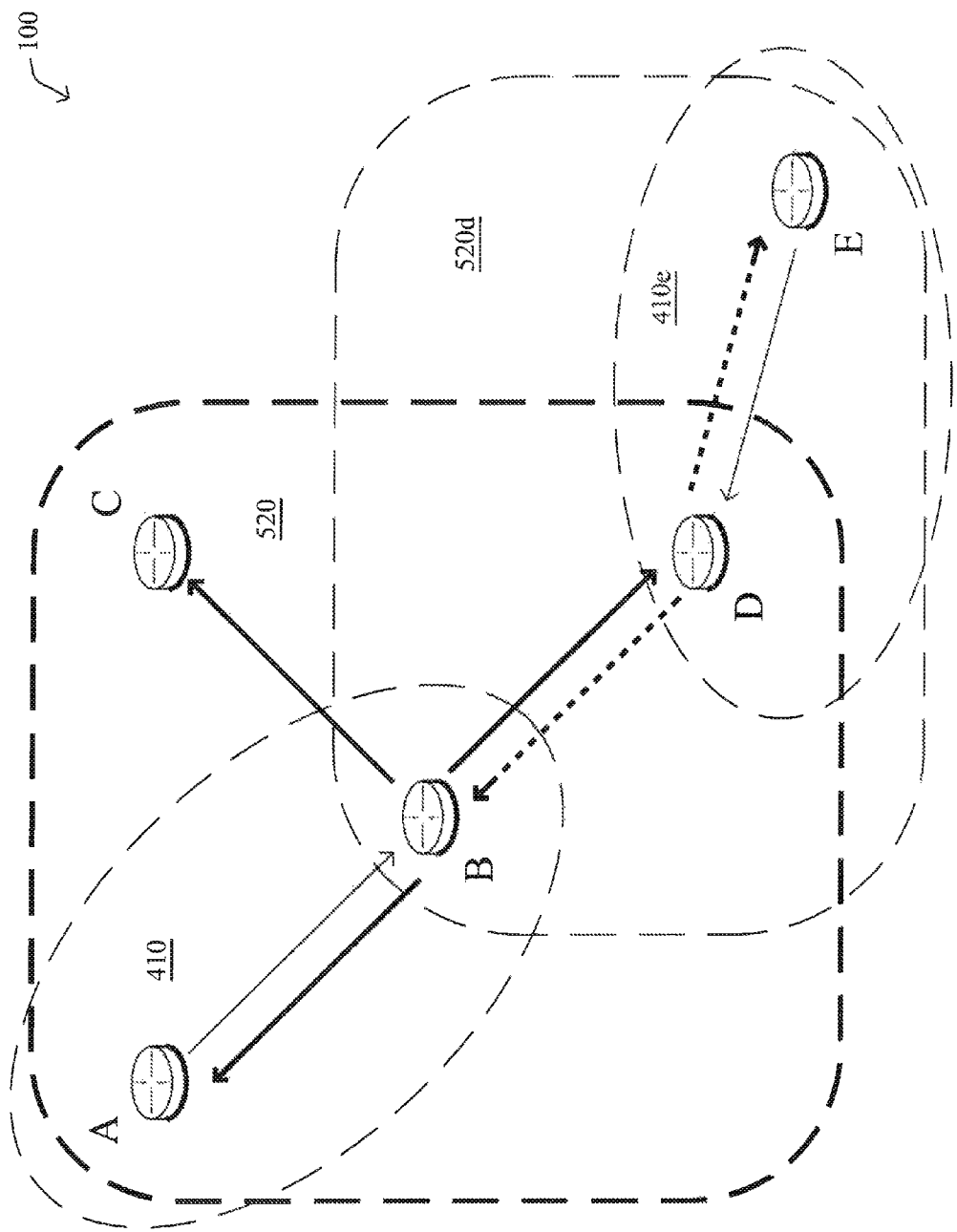

Similarly, in FIG. 7B, it can be seen that when node D receives a transmission 410e from node E, that it, too, may send out a CSDA signal 520d, which may be heard by node B. (It may also conflict with node B's transmission, but where continuous signals are used to merely indicate presence or absence of a CSDA signal, this overlapping conflict need not be resolved.) Again, in this situation, node B is merely receiving, and need not worry about node D's request to not transmit colliding traffic. When node B detects the CSDA signal from node D it may use this signal to delay sending an acknowledgement to node A as not to cause a collision between its acknowledgment to node A for message 410.

Figure 7C:
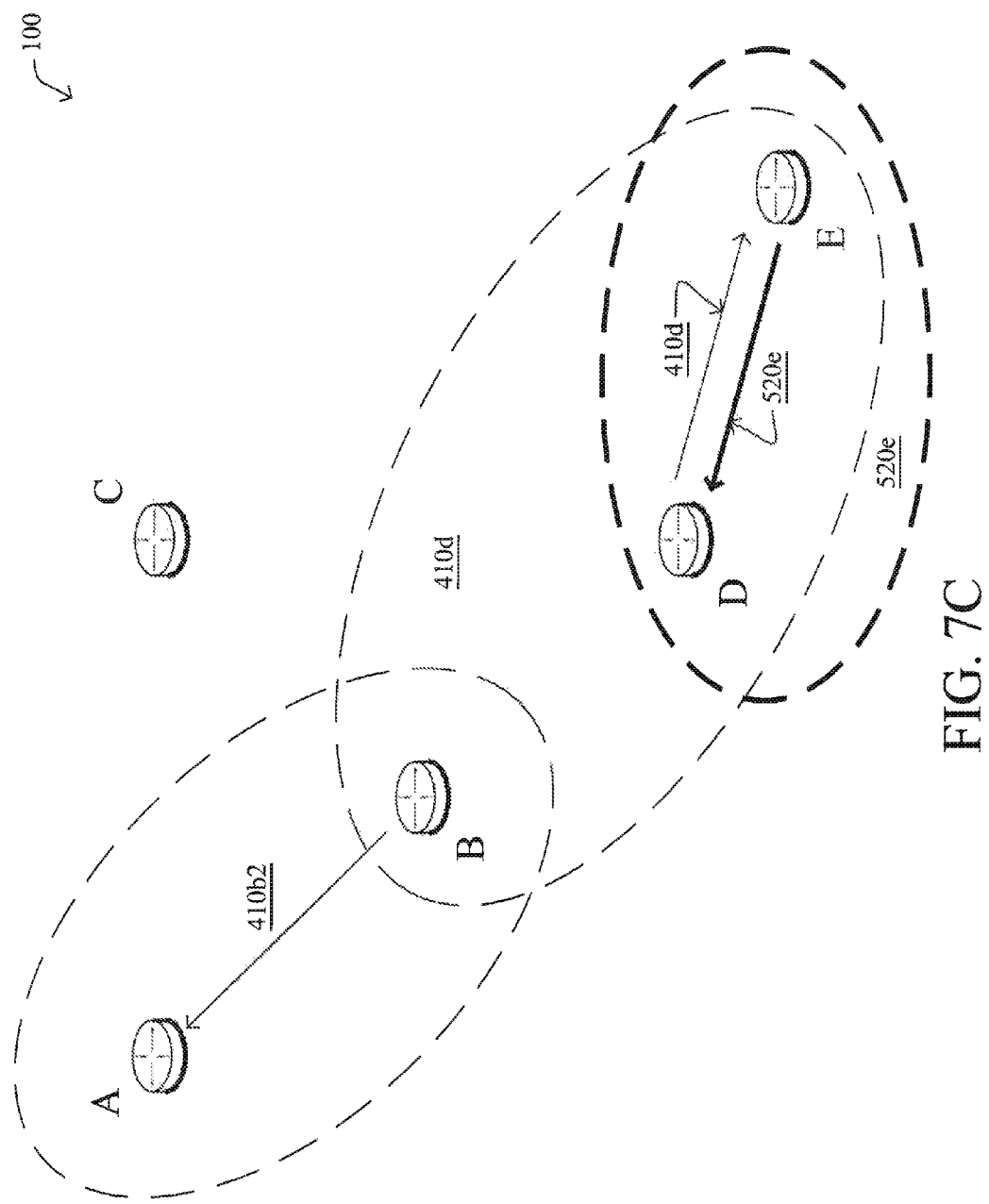

As still another example of operation, FIG. 7C illustrates the instance where node D sends an initial transmission 410*d* to node E, and is thus not intended for node B. As such, node B does not send out a CSDA signal 520, as it is not concerned with any collisions in response to node D's transmission. In fact, as shown, assuming node B does not hear a CSDA signal from any other node, particularly from node E (signal 520*e*) in response to node D's transmission 410*d*, then node B may transmit its own wireless signal (e.g., a message/packet 300) 410*b*2 to any of its neighbors, such as node A, without concern of colliding with node D's transmission at node E.

Figure 7D:
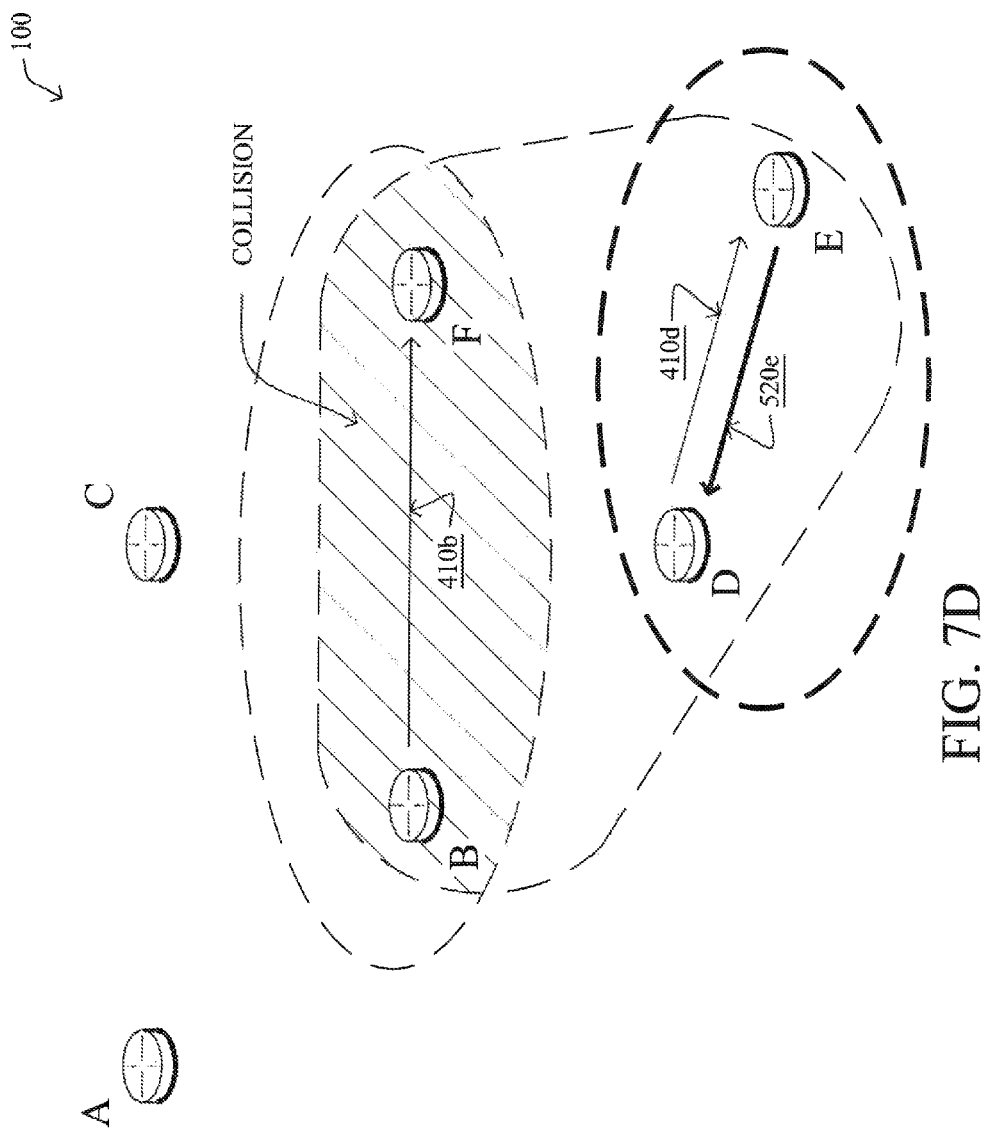

There may be occasions, however, where node B's transmission 410*b*2 will still collide at its intended receiver. For instance, assume as shown in FIG. 7D an additional node F that also receives node D's transmission, whether or not within listening range of node E. If node B, which is not within listening distance of node E, decides to transmit its signal 410*b*2 to node F, then node F ends up receiving colliding signals from nodes B and D. In this instance, collision mitigation may take place, where node B may reattempt to transmit, e.g., after a random back-off timer. Also, in the event node F manages to receive node B's transmission and sends out a CSDA signal, when node D receives this signal during its previously begun transmission to node E, node D may be configured to ignore the CSDA signal in order to complete its initiated transmission 410*d*.

Figure 8:
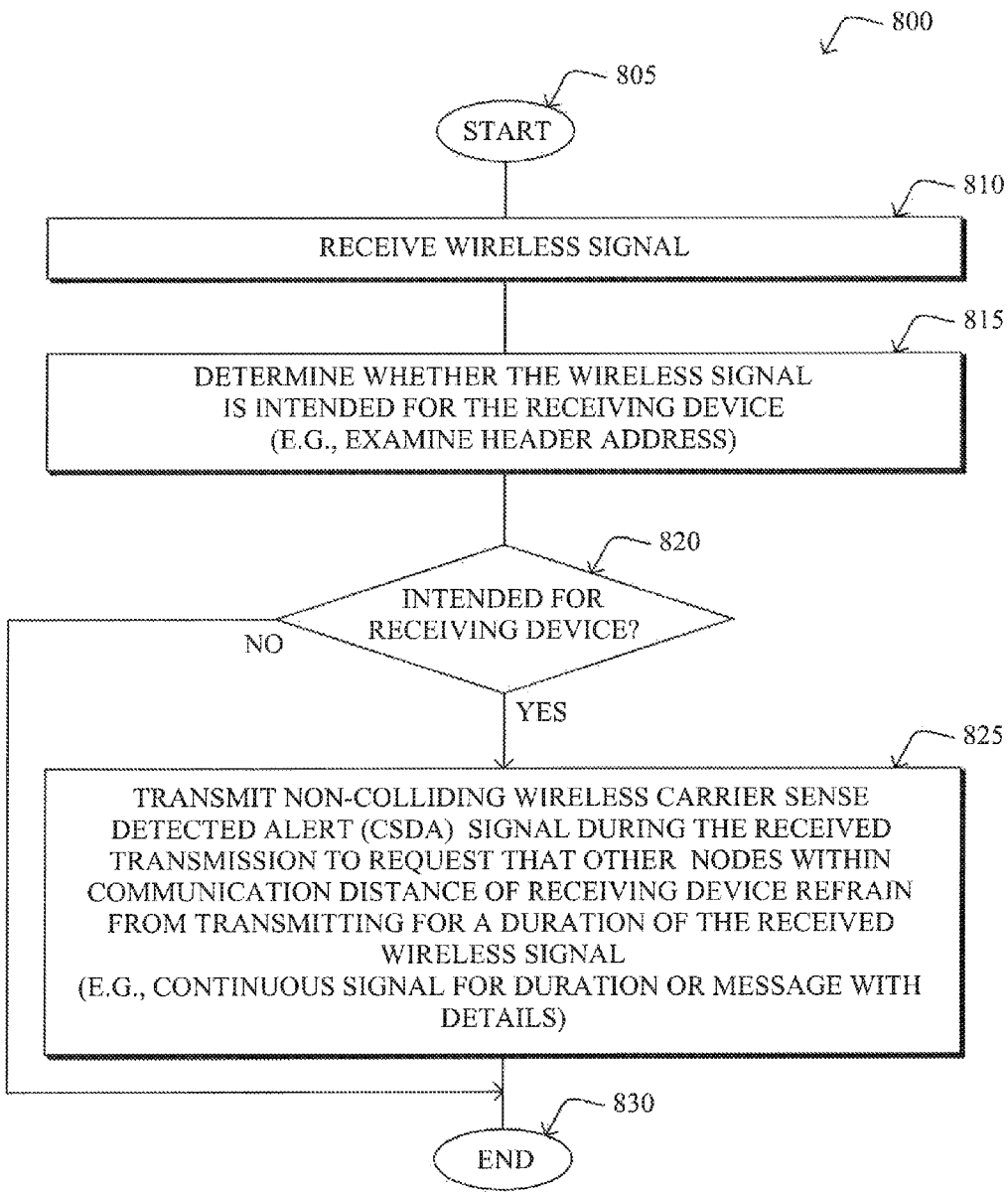
FIG. 8 illustrates an example procedure for providing collision avoidance in wireless networks from the perspective of a receiving device.

In closing, FIG. 8 illustrates an example simplified procedure for providing collision avoidance in a wireless network in accordance with one or more embodiments described herein, e.g., from the perspective of a receiving node (e.g., B). The procedure 800 starts at step 805, and continues to step 810, where the receiving node receives a wireless signal 410 (e.g., packet 300). Upon receiving the signal, the receiving device may then determine whether the wireless signal is intended for itself in step 815, such as by examining the header address 314 as noted above. If the receiving device is not the intended recipient in step 820, then the procedure ends in step 830, by ignoring the remainder of the transmission.

If, on the other hand, in step 820, the receiving device is the intended recipient, then in step 825 the receiving device may transmit a non-colliding wireless CSDA signal 520 during the received wireless signal to request that other nodes within communication distance of the receiving device (e.g., node C) refrain from transmitting for a duration of the received wireless signal, as described in detail above. For instance, as noted above, the CSDA signal 520 may be a continuous signal for the duration (e.g., FIG. 6A), or a message with specific details (e.g., FIG. 6B or two messages in FIG. 6C). The procedure 800 ends in step 830, once the received wireless signal 410 is completed and once any CSDA signals 520 are no longer transmitted. Any subsequently received wireless signals 410 may initiate the procedure again at steps 805/810, accordingly.

Figure 9:
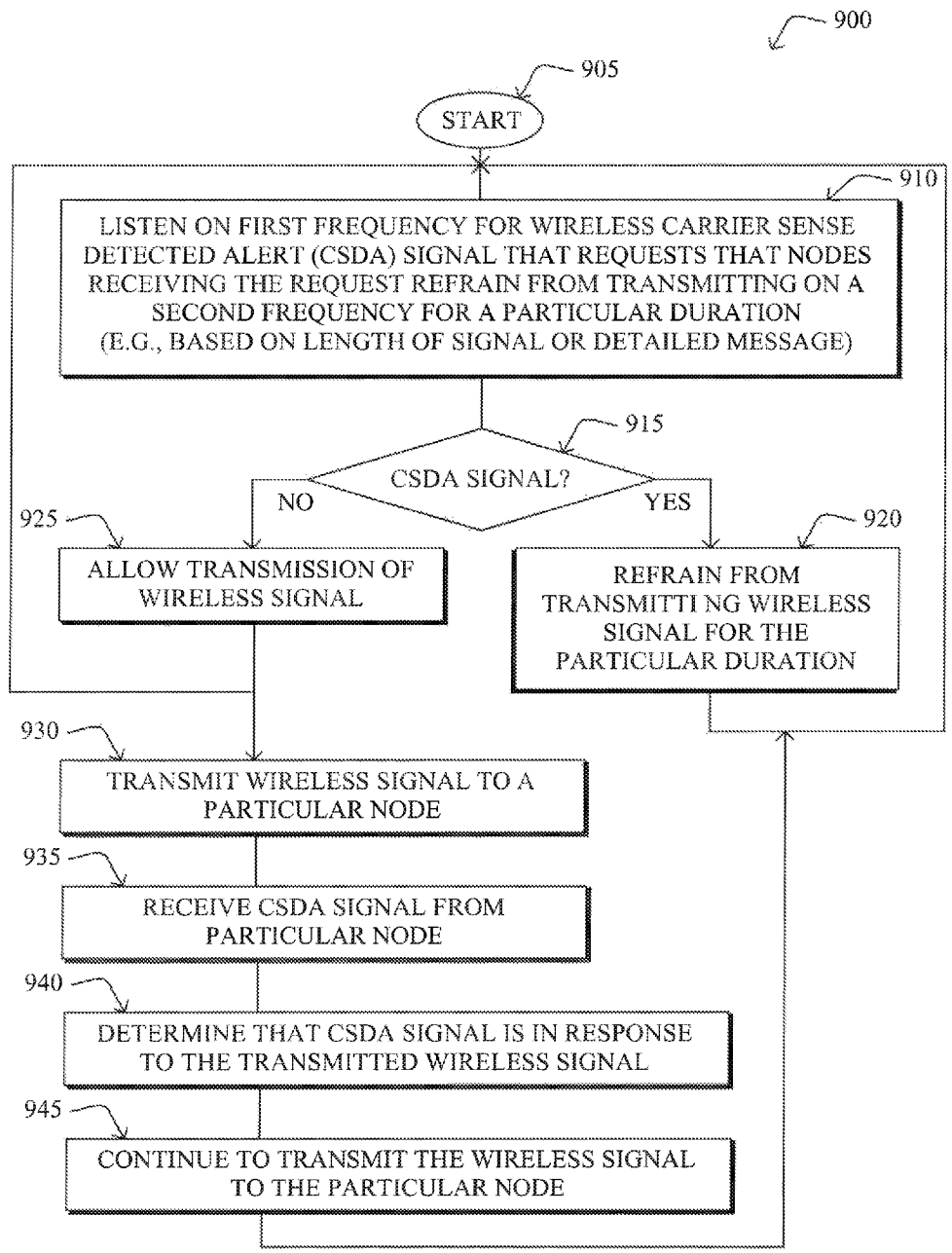
FIG. 9 illustrates an example procedure for providing collision avoidance in wireless networks from the perspective of a transmitting device.

Additionally, FIG. 9 illustrates an example simplified procedure for providing collision avoidance in a wireless network in accordance with one or more embodiments described herein, e.g., from the perspective of a transmitting node (e.g., A). The procedure 900 starts at step 905, and continues to step 910, where the node listens on a first frequency for wireless CSDA signals that request that nodes receiving the request refrain from transmitting on a second frequency (the one that would collide) for a particular duration. As described above, such CSDA signals may be transmitted in a manner that relays the duration to receiving nodes based on the length of the signal (e.g., FIG. 6A) or based on details within a message or two (e.g., FIGS. 6A and 6B, respectively).

In response to detecting a CSDA signal in step 915, then in step 920 the node may refrain from transmitting wireless signals on the second frequency for the particular duration, according to the techniques described herein. However, in response to not detecting a CSDA signal in step 915, then in step 925 transmission of wireless signals may be allowed by the transmitting device (while still listening for CSDA signals in step 910. For instance, if so desired during this time, node A may transmit a wireless signal on the second frequency to a particular node (e.g., node B) in step 930. Notably, as mentioned above, it is possible that in step 935 the transmitting device A receives a CSDA signal from the particular node. As such, the transmitting device may determine in step 940 that the CSDA signal is in response to the transmitted wireless signal from node A, and may accordingly continue to transmit the wireless signal to the particular node B in step 945. Once the transmission of packet 300 completes, the procedure 900 returns to step 910 to continue listening for further CSDA signals, e.g., once either any CSDA signals (or their indicated durations) have subsided (step 920), or once any transmitted wireless signal is completed (step 945).

The novel techniques described herein, therefore, provide collision avoidance in a wireless network. By generating a "synthetic" carrier signal (CSDA signal), hidden nodes may be alerted that a neighbor node is receiving a packet, e.g., on a second frequency, which therefore prevents the hidden nodes from sending data that may corrupt the original packet. The resulting system has a greatly reduced collision rate for packets of all sizes as compared with current systems, and thus improves network efficiency (effective bandwidth).

Additionally, the techniques herein also facilitate longer packets without increasing collision rates, and as such can further increases the effective network efficiency (effective bandwidth) by enabling nodes to send longer packets without increasing the probability of the longer messages to be corrupted by packets from hidden neighbors. For example, existing ALOHA systems, as may be understood by those skilled in the art, typically limit the length of packets because the longer a packet is the higher is the probability that other packets would collide with the specific long packet. The fact that packet length in existing systems is reduced to protect the packets from collision with other packets reduces the efficiency of the network (the shorter the packet, the lower the ratio of (useful data size)/(packet size)). In contrast, using one or more of the embodiments herein, the longer the packet is, the longer is the time in which the receiving node protects itself (using the CSDA signal/message), and therefore the smaller is the probability of collision.

Moreover, there may be events where a system still experiences a collision according to the techniques above (albeit at a much lower rate than in simple ALOHA systems). For example, it may be the case that nodes A and C start sending packets at substantially the same time (e.g., FIG. 4, where A and C transmit simultaneously). That is, the two packets may collide during the time it may take node B decode the address of a packet and send the CSDA signal, and therefore the collision would not be averted. (Note that conventional CSMA systems also suffer from this potential collision period.) In this instance, the recovery mechanism is the same as in existing systems, where the sending node does not receive an acknowledgment and therefore it resends the original message. It should be noted, however, that the packet header is generally only a fraction of the overall length of the packet. Therefore, while not averting all collisions, the techniques herein still greatly reduce the number of collisions in a majority of circumstances.

Still further, contrary to RTS/CTS exchanges, no packet size thresholds exist, so any sized (any length) transmission may benefit from the collision avoidance techniques herein. Also, the techniques herein do not require nodes to request permission to send their packet, which may be particularly suitable for low power devices that only activate periodically to transmit their current information (e.g., sensors). Moreover, certain embodiments herein, such as the continuous CSDA signal (FIG. 6A) alleviate the need for hidden nodes to be able to hear a singular message (e.g., a CTS) to know not to transmit colliding data, including knowing not to sent an RTS frame. Lastly, the techniques herein add minimal overhead to the data transmission in the network as compared to an RTS/CTS exchange, e.g., only adding either a single message or a continuous signal on a dedicated frequency (e.g., a very small designated bandwidth).

While there have been shown and described illustrative embodiments that provide collision avoidance in a wireless network, it is to be understood that various other adaptations and modifications may be made within the spirit and scope of the embodiments herein. For example, the embodiments have been shown and described herein with relation to wireless networks, such as LLNs. However, the embodiments in their broader sense are not as limited, and may, in fact, be used with other types of networks and/or protocols where only certain nodes within the network communicate wirelessly. Further, while the term "carrier sense detected alert (CSDA)" is used for the notification from the receiving node to its neighbor nodes that it is receiving a transmission, this term is not meant to limit the embodiments herein to particular carrier sensing protocols (e.g., CSMA/CA, among others).

Also, while the above embodiments describe collision avoidance based on time of transmission, additional embodiments may also account for collision avoidance based on transmission frequency. For instance, certain wireless devices may be able to communicate on controllable frequencies (e.g., independent of frequency hopping sequences). In this instance, if a transmitted wireless signal is transmitted on a first frequency, then the CSDA signal (which is transmitted on a second frequency) may inform neighbors (e.g., within a message) of the first frequency, such that those neighbors may specifically refrain from transmitting on the first frequency for the duration of the received wireless signal. Accordingly, the neighbors may, if able to, transmit on other frequencies (e.g., orthogonal frequencies).

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   receiving, on a first frequency, a wireless signal at a particular node in a wireless network from a sending node, the wireless signal including an indication of a duration of the received wireless signal;
   determining, at the particular node, whether the wireless signal is intended for the particular node before the wireless signal is completely received by examining a header of the received wireless signal to determine whether a destination address within the header corresponds to an address of the particular node; and
   in response to determining that the wireless signal is intended for the particular node, transmitting, on a second frequency orthogonal from the first frequency, a non-colliding wireless carrier sense detected alert (CSDA) signal from the particular node while the wireless signal is being received to request that other nodes within communication distance of the particular node, except the sending node, refrain from transmitting for the duration of the received wireless signal.

2. The method as in claim 1, wherein transmitting comprises:
   transmitting the CSDA signal as a continuous signal for the duration of the received wireless signal.

3. The method as in claim 1, wherein transmitting comprises:
   transmitting the CSDA signal as a message that indicates the duration of the received wireless signal.

4. The method as in claim 3, further comprising:
   including within the message a frequency of the received wireless signal to request that other nodes within communication distance of the particular node refrain from transmitting on the frequency of the received wireless signal for the duration of the received wireless signal.

5. The method as in claim 3, further comprising:
   including within the message a time-to-live (TTL) value of zero to prevent the other nodes from forwarding the message.

6. The method as in claim 1, wherein transmitting comprises:
   transmitting the CSDA signal as:
   i) a first message that requests that other nodes within communication distance of the particular node refrain from transmitting; and
   ii) a second message that indicates that other nodes within communication distance of the particular node can resume transmitting.

7. An apparatus, comprising:
   one or more wireless network interfaces configured to receive a wireless signal on a first frequency, the wireless signal including an indication of a duration of the received wireless signal;
   a processor coupled to the wireless network interfaces and configured to execute one or more processes; and
   a memory configured to store a process executable by the processor, the process when executed configured to:
   determine, at the apparatus, whether the received wireless signal is intended for the apparatus before the wireless signal is completely received at the apparatus by examining a header of the received wireless signal to determine whether a destination address within the header corresponds to an address of the particular node; and transmit, in response to the wireless signal being intended for the apparatus, on a second frequency orthogonal from the first frequency, a non-colliding wireless carrier sense detected alert (CSDA) signal on at least one of the wireless network interfaces while the wireless signal is being received to request that other nodes within communication distance of the apparatus, except the sending node, refrain from transmitting for the duration of the received wireless signal.

8. The apparatus as in claim 7, wherein the CSDA signal comprises a continuous signal transmitted for the duration of the received wireless signal.

9. The apparatus as in claim 7, wherein the CSDA signal comprises a message that indicates the duration of the received wireless signal.

10. A tangible, non-transitory, computer-readable media having software encoded thereon, the software when executed by a processor configured to:
  determine, at the particular node, whether a wireless signal received on a first frequency at a particular node is intended for the particular node before the wireless signal is completely received by examining a header of the received wireless signal to determine whether a destination address within the header corresponds to an address of the particular node; and
  in response to a determination that the wireless signal is intended for the particular node, transmit, on a second frequency orthogonal from the first frequency, a non-colliding wireless carrier sense detected alert (CSDA) signal from the particular node while the wireless signal is being received to request that other nodes within communication distance of the particular node, except the sending node, refrain from transmitting for the duration of the received wireless signal.

11. The tangible, non-transitory, computer-readable media as in claim 10, wherein the CSDA signal comprises a continuous signal transmitted for the duration of the received wireless signal.

12. The tangible, non-transitory, computer-readable media as in claim 10, wherein the CSDA signal comprises a message that indicates the duration of the received wireless signal.

13. The tangible, non-transitory, computer-readable media as in claim 12, the software when executed by the processor configured to:
  include within the message a frequency of the received wireless signal to request that other nodes within communication distance of the particular node refrain from transmitting on the frequency of the received wireless signal for the duration of the received wireless signal.

* * * * *